US012020834B2

(12) United States Patent
Shimizu et al.

(10) Patent No.: US 12,020,834 B2
(45) Date of Patent: Jun. 25, 2024

(54) SHIELDED COMMUNICATION CABLE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Toru Shimizu, Mie (JP); Takaki Endo, Mie (JP); Ryoma Uegaki, Mie (JP); Kenichiro Iwama, Mie (JP); Kinji Taguchi, Mie (JP); Satoshi Okano, Tochigi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 229 days.

(21) Appl. No.: 17/421,274

(22) PCT Filed: Jan. 9, 2020

(86) PCT No.: PCT/JP2020/000407
§ 371 (c)(1),
(2) Date: Jul. 7, 2021

(87) PCT Pub. No.: WO2020/149202
PCT Pub. Date: Jul. 23, 2020

(65) Prior Publication Data

US 2021/0398710 A1 Dec. 23, 2021

(30) Foreign Application Priority Data

Jan. 15, 2019 (JP) ................................ 2019-004099

(51) Int. Cl.
*H01B 7/18* (2006.01)
*H01B 7/22* (2006.01)
(Continued)

(52) U.S. Cl.
CPC .......... *H01B 7/1875* (2013.01); *H01B 7/228* (2013.01); *H01B 11/002* (2013.01)

(58) Field of Classification Search
CPC .... H01B 7/1875; H01B 7/228; H01B 7/0807; H01B 7/0861; H01B 7/0823; H01B 11/10;
(Continued)

(56) References Cited

U.S. PATENT DOCUMENTS 5,015,800 A * 5/1991 Vaupotic ............ H01B 13/0023 174/34
5,142,100 A * 8/1992 Vaupotic ............ H01B 11/1025 29/857
(Continued)

FOREIGN PATENT DOCUMENTS

JP 54-154092 12/1979
JP S54154092 A * 12/1979
(Continued)

OTHER PUBLICATIONS

Japan Office Action issued in Japan Patent Application No. 2020-566388, dated Mar. 22, 2022, together with English translation thereof.
(Continued)

*Primary Examiner* — Hoa C Nguyen
*Assistant Examiner* — Amol H Patel
(74) *Attorney, Agent, or Firm* — GREENBLUM & BERNSTEIN, P.L.C.

(57) ABSTRACT

Disclosed is a shielded communication cable containing a parallel electric cable containing a pair of insulated wires
(Continued)

arranged parallel to each other without being twisted. The shielded communication cable exhibits excellent noise shieldability and hardly generates signal propagation time difference. The shielded communication cable contains a parallel electric cable containing a pair of insulated wires arranged parallel to each other. Each of the insulated wires contains a conductor and an insulation coating that covers the conductor. A braided shield containing elemental wires braided together and a film-shaped shield containing a metal film are arranged at an outer circumference of the parallel electric cable.

2 Claims, 4 Drawing Sheets

(51) Int. Cl.
*H01B 11/00* (2006.01)
*H01B 11/02* (2006.01)

(58) Field of Classification Search
CPC ............ H01B 11/1008; H01B 11/1025; H01B 11/1033; H01B 11/08; H01B 11/06; H01B 11/002
See application file for complete search history.

(56) References Cited

U.S. PATENT DOCUMENTS

| | | | | |
|---|---|---|---|---|
| 5,283,390 | A * | 2/1994 | Hubis | H01B 11/002 174/102 R |
| 8,546,691 | B2 * | 10/2013 | Watanabe | H01B 11/1834 174/105 R |
| 2002/0139561 | A1 | 10/2002 | Buck et al. | |
| 2008/0073105 | A1 * | 3/2008 | Clark | H01B 7/295 174/113 R |
| 2011/0232941 | A1 * | 9/2011 | Sugiyama | H01B 11/203 174/250 |
| 2013/0087361 | A1 * | 4/2013 | Kaga | H01B 3/441 174/110 SR |
| 2015/0096785 | A1 | 4/2015 | Hayashishita et al. | |
| 2015/0310966 | A1 | 10/2015 | Huang et al. | |

FOREIGN PATENT DOCUMENTS

| | | |
|---|---|---|
| JP | 59-061410 U | 4/1984 |
| JP | 2001-195924 | 7/2001 |
| JP | 2001195924 A * | 7/2001 |
| JP | 2004-524663 | 8/2004 |
| JP | 2005-032583 | 2/2005 |
| JP | 2005-056590 | 3/2005 |
| JP | 2010-211937 | 9/2010 |
| JP | 2011-187290 | 9/2011 |
| JP | 2011-198677 | 10/2011 |
| JP | 2012-146591 | 8/2012 |
| JP | 2014-216177 | 11/2014 |
| JP | 2015-072806 | 4/2015 |
| JP | 2015-210919 | 11/2015 |

OTHER PUBLICATIONS

International Search Report issued in International Patent Application No. PCT/JP2020/000407, dated Feb. 10, 2020, along with an English translation thereof.
International Preliminary Report on Patentability issued in International Patent Application No. PCT/JP2020/000407, dated Mar. 18, 2021, along with an English translation thereof.
China Office Action issued in China Patent Application No. 202080009283.X, dated May 27, 2022, together with English translation thereof.

* cited by examiner

SHIELDED COMMUNICATION CABLE

TECHNICAL FIELD

The present disclosure relates to a shielded communication cable.

BACKGROUND ART

Demand for high-speed communication has been increasing in fields such as automobile. In a high-speed communication system, communication cables containing paired insulated wires are widely employed for communication using differential signals. As such communication cables used for communication using differential signals, twisted pair wires are well known which contain paired insulated wires twisted together each containing a conductor, and an insulation coating that covers an outer circumference of the conductor, as disclosed in Patent Document 1. The use of the twisted pair wires enhances canceling of external common mode noise and stabilization of the communication.

CITATION LIST

Patent Literature

Patent Document 1: JP 2005-032583 A

Communication in the high-frequency band such as GHz band has been demanded for the recent high-speed communication. The use of the twisted pair wires as disclosed in Patent Document 1 may cause signal attenuation in the high-frequency band due to the periodic twist structure of the wires.

In the case where the paired insulated wires are not twisted but arranged parallel to each other, a magnitude of the signal attenuation is low even in the high-frequency band. However, since the paired insulated wires are not respectively twisted, the relative position between the cables is changed such as when the communication cable is bent. Thus, the cable is likely to be affected by external noise and signal propagation time difference tends to occur.

SUMMARY OF INVENTION

Technical Problem

In light of the above-described problem, it is an object of the disclosure to provide a shielded communication cable that contains a parallel electric cable containing a pair of insulated wires arranged parallel to each other without being twisted, which is unsusceptible to external noise, and unlikely to generate signal propagation time difference.

Solution to Problem

The shielded communication cable according to the disclosure contains a parallel electric cable containing a pair of insulated wires arranged parallel to each other. Each of the insulated wires contains a conductor and an insulation coating that covers the conductor. The shielded communication cable contains a braided shield containing elemental wires braided together and a film-shaped shield containing a metal film at an outer circumference of the parallel electric cable.

Advantageous Effects of Invention

According to the present disclosure, the shielded communication cable containing a parallel electric cable containing a pair of insulated wires arranged parallel to each other without being twisted is provided, which is unsusceptible to external noise, and unlikely to generate signal propagation time difference.

DESCRIPTION OF EMBODIMENTS

Description of Embodiments of Disclosure

Figure 1:
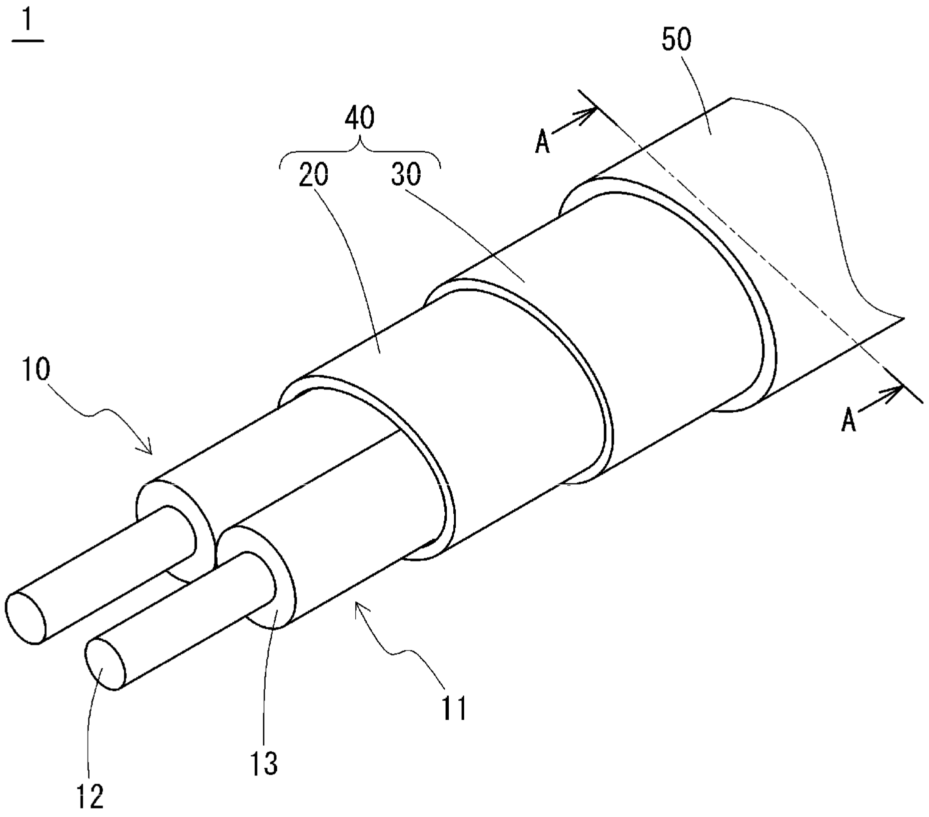
FIG. 1 is a perspective view showing an exterior appearance of a shielded communication cable according to a first embodiment of the disclosure.

Embodiments of the disclosure will be described.

A shielded communication cable according to a preferred embodiment contains a parallel electric cable containing a pair of insulated wires arranged parallel to each other. Each of the insulated wires contains a conductor and an insulation coating that convers the conductor. The shielded communication cable contains braided shield containing elemental wires braided together, and a film-shaped shield containing a metal film at an outer circumference of the parallel electric cable.

In the shielded communication cable, the insulated wires are not twisted but arranged parallel to each other. The cable having no twisting structure ensures to lessen the signal attenuation due to the periodic structure of the cable, like resonance phenomena, even in the high-frequency band compared with the case of twisted pair wires.

The shielded communication cable contains the braided shield and the film-shaped shield, and thus the cable exhibits excellent noise shieldability compared with the case where either the braided shield or the film-shaped shield is used alone. Compared with the twisted pair wires containing the paired insulated wires twisted together, the parallel electric cables are susceptible to noise. However, the use of combination of the braided shield and the film-shaped shield allows the parallel electric cable to achieve stabilized communication.

The insulated wires constituting the parallel electric cable are bound together through the double shielded structure composed of the braided shield and the film-shaped shield arranged at the outer circumference of the parallel electric cable. As a result, variation in spacing between the insulated wires hardly occurs, and symmetry of the insulated wires may be maintained easily. Thus, propagation time difference owing to a difference in length between the insulated wires is suppressed. Further, as the external noise may affect the both insulated wires evenly, the shielded communication cable is less susceptible to external noise and suffers little influence of the noise. This makes it possible to suppress generation of induction noise or resonance phenomena.

In a preferred embodiment, the shielded communication cable preferably contains the braided shield and the film-shaped shield at the outer circumference of the parallel electric cable in this order from an inner side of the cable. With this arrangement, the braided shield especially exhibits an excellent property of fastening the insulated wires, thus preventing relative displacement of the insulated wires. The arrangement especially effective for suppressing the propagation time difference due to a difference in length between the insulated wires, and lessening the affection of external noise. As the parallel electric cable is bound through the braided shield having noise shielding effect, it is possible to reduce the diameter of the shielded communication cable, and simplify the structure of the communication cable compared with the case where other binding members such as insulating tape materials are used for binding the parallel electric cable, resulting in excellent productivity of the cable.

The insulated wires of the parallel electric cable are preferably fused or bound together. With this arrangement, positional displacement between the insulated wires is prevented. The arrangement is especially effective for suppressing the propagation time difference owing to a difference in length between the insulated wires, and lessening the affection of external noise.

The insulated wire preferably contains a fusion layer that is meltable by heat at the outer circumference of the insulation coating, and the insulated wires are preferably fused to each other via the fusion layers. It is especially preferable that the fusion layer contains a thermoplastic resin. In these cases, deformation of the insulation coating may be suppressed in the fusing process of the insulated wires, leading to excellent symmetry of the insulated wires. Thus, the arrangements are especially effective for suppressing the propagation time difference owing to a difference in length between the insulated wires, and lessening the affection of external noise.

In another preferred embodiment, the shielded communication cable preferably contains the film-shaped shield and the braided shield at the outer circumference of the parallel electric cable in this order from an inner side of the cable. The insulated wires are preferably movable relative to each other inside the film-shaped shield. With this arrangement, where the shielded communication cable is bent, the insulated wires may move relative to each other inside the film-shaped shield, and absorb the load applied to the communication cable, and thus variation in spacing between the insulated wires hardly occurs. As a result, the insulated wires exhibit excellent symmetry. Thus, the arrangement is especially effective for suppressing the propagation time difference owing to a difference in length between the insulated wires, and for lessening the affection of external noise. In this arrangement, when the parallel electric cable is effectively bound through the braided shield having noise shielding effect, it is possible to reduce the diameter of the shielded communication cable, and simplify the structure of the cable compared with the case where other binding members such as insulating tape materials are used for binding of the parallel electric cable, resulting in excellent productivity.

DETAILS OF EMBODIMENTS OF THE DISCLOSURE

The shielded communication cable according to embodiments of the disclosure will be described in detail referring to the drawings. The shielded communication cables according to the first, second, and third embodiments of the disclosure will be sequentially described in this order hereinafter.

[Overall Structure]

Common structures of the shielded communication cables according to the respective embodiments will be described.

As shown in FIGS. 1 to 4, a shielded communication cable 1 (or 1A or 1B; hereinafter similarly referred in the section of overall structure) contains a parallel electric cable 10 containing a pair of insulated wires 11 arranged parallel to each other. Each of the insulated wires 11 contains a conductor 12 and an insulation coating 13 that convers the conductor 12.

A shielding body 40 is arranged at an outer circumference of the parallel electric cable 10. In the shielding body 40, a braided shield 20 containing elemental wires braided together and a film-shaped shield 30 containing a metal film are laminated. One of the braided shield 20 and the film-shaped shield 30 which constitute the shielding body 40 directly covers the parallel electric cable 10.

The shielded communication cable 1 further contains a jacket 50 that covers the shielding body 40. The jacket 50 is made of an insulating material, and protects the parallel electric cable 10 located inside the jacket 50.

(Structure of Parallel Electric Cable)

Details of the materials, dimensions, and the like of the respective insulated wires 11 constituting the parallel electric cable 10 are not specifically limited as long as they are the same as each other. The conductor 12 contained in the insulated wire 11 may be appropriately made of a metal material such as copper, copper alloy, aluminum, and aluminum alloy. The insulation coating 13 may be appropriately made of an insulating polymer material.

The conductor 12 may be formed as a single wire made of the above-described metal material. However, it is preferable that the conductor 12 is formed as a twisted wire containing a plurality of elemental wires twisted together from the viewpoint of improving bendability. The same elemental wires, or two or more different types of elemental wires may be used for forming the twisted wire.

It is preferable that a conductor cross-sectional area of the conductor 12 is smaller than 0.22 $mm^2$, and more preferably, 0.15 $mm^2$ or smaller, or 0.13 $mm^2$ or smaller. It is preferable that the outer diameter of the conductor 12 is 0.55 mm or smaller, and more preferably, 0.50 mm or smaller, or 0.45 mm or smaller. Reduction in the diameter of the conductor 12 shortens spacing between the conductors 12 (distance between the centers of the respective conductors 12) of the parallel electric cable 10, resulting in high characteristic impedance of the shielded communication cable 1. That is, even if the thickness of the insulation coating 13 that covers the conductor 12 is reduced, the characteristic impedance required for the shielded communication cable 1 may be secured because of the reduced spacing between the conductors 12.

It is preferable that the conductor 12 has a tensile strength of 400 MPa or higher. Where the conductor 12 has a high tensile strength, sufficient strength for the use as an electric wire can be secured even when the diameter of the conductor 12 is reduced. As described above, the reduction in the diameter of the conductor 12 shortens spacing between the conductors 12 (distance between the centers of the conductors 12) of the insulated wires 11 constituting the parallel electric cable 10, resulting in high characteristic impedance of the shielded communication cable 1. That is, even if the thickness of the insulation coating 13 that covers the conductor 12 is reduced, the characteristic impedance required for the shielded communication cable 1 may be secured because of the reduced spacing between the conductors 12.

It is preferable that the conductor 12 has a high breaking elongation of 7% or higher. When the conductor 12 has a high breaking elongation, the symmetry of the insulated wires 11 constituting the parallel electric cable 10 may be maintained even when the parallel electric cable 10 is bent. Thus, the propagation time difference owing to a difference in length between the insulated wires 11 is prevented, and the affection of external noise is lessened.

The tensile strength and the breaking elongation of the conductor 12 are largely influenced by the ingredient composition of the conductor 12. Meanwhile, the tensile strength and the breaking elongation may be improved by executing heat treatment after wire drawing. As the conductor 12 having high tensile strength and high breaking elongation, the first copper alloy and the second copper alloy containing the following ingredient compositions may be exemplified.

The first copper alloy contains the following composition elements and a balance of Cu and unavoidable impurities:

Fe: 0.05 mass % or higher and 2.0 mass % or lower

Ti: 0.02 mass % or higher and 1.0 mass % or lower

Mg: 0 mass % or higher and 0.6 mass % or lower (including the case where Mg is not contained in the alloy).

The second copper alloy contains the following composition elements and a balance of Cu and unavoidable impurities:

Fe: 0.1 mass % or higher and 0.8 mass % or lower

P: 0.03 mass % or higher and 0.3 mass % or lower

Sn: 0.1 mass % or higher and 0.4 mass % or lower

Examples of the insulating polymer material contained in the insulation coating 13 include polyethylene, polypropylene, polyvinyl chloride, polystyrene, polytetrafluoroethylene, and polyphenylenesulfide. The insulation coating 13 may contain additives such as a filler and a flame retardant as necessary. The insulating polymer material contained in the insulation coating 13 may or may not be crosslinked. When a cross-linked polymer material is used, heat resistance of the insulation coating 13 may be improved.

The polymer material contained in the insulation coating 13 may or may not be foamed. It is preferable that the material is foamed from the viewpoint of reducing the weight of the insulation coating 13. On the other hand, it is preferable that the material is not foamed from the viewpoint of simplifying the manufacturing process of the insulation coating 13.

It is preferable that the thickness of the insulation coating 13 is 0.30 mm or smaller, more preferably, 0.25 mm or smaller, and still more preferably 0.20 mm or smaller from the viewpoint of reducing diameter and improving bendability of the insulated wire 11. If the insulation coating 13 is too thin, it may be hard to secure the characteristic impedance required for the shielded communication cable 1. Thus, the thickness of the insulation coating 13 is preferably 0.15 mm or larger.

In the insulated wire 11, it is preferable that the uniformity in the thickness of the insulation coating 13 around the conductor 12 should be higher. In other words, it is preferable that thickness deviation of the insulation coating 13 should be smaller. In that case, eccentricity of the conductor 12 would be smaller, and thus the symmetry of the conductors 12 of the insulated wires 11 would be higher when the insulated wires 11 are arranged parallel to each other to constitute the parallel electric cable 10. As a result, signal propagation time difference hardly occurs, and the cable will be unsusceptible to external noise, resulting in improved transmission characteristics of the shielded communication cable 1. It is preferable that the eccentricity ratio is in the range of, for example, 65% or higher. Here, the eccentricity ratio as the ratio of the smallest value to the largest value of the thickness of the insulation coating 13 is expressed as a percentage ([smallest insulation thickness]/[largest insulation thickness]×100%).

The parallel electric cable 10 has a pair of the insulated wires 11 which are not twisted together, but arranged parallel to each other. Herein, the term "parallel" or "arranged parallel" is not limited to the geometrical concept of "parallel", but permits some displacement to some degrees. Ideally, the term refers to the state where a distance between the insulated wires 11 is constantly kept at a small value, for example, substantially 0 mm with the insulated wires 11 in symmetrical arrangement. For example, when the parallel electric cable 10 is bent, and where the distance between the insulated wires 11 is 0.5 mm or smaller, it falls within allowable displacement. As the insulated wires 11 are arranged in parallel to each other with high symmetry, the signal attenuation caused, for instance, by resonance phenomena may be made small even in the high frequency band in comparison with twisted pair wires containing insulated wires twisted together. Further, the propagation time difference owing to a difference in length between the insulated wires hardly occurs, and the affection of external noise may be lessened. Examples of the method of making spacing between the insulated wires 11 small and constant, which will be described in detail later, include binding of the insulated wires 11 constituting the parallel electric cable 10 using a braided shield 20 or a film-shaped shield 30 arranged to cover the parallel electric cable 10, and fusing or bonding of the insulated wires 11 arranged parallel together.

(Structure of Shielding Body)

Each of the shielded communication cables 1 according to the respective embodiments of the disclosure contains the shielding body 40 at the outer circumference of the parallel electric cable 10. The shielding body 40 contains the braided shield 20 and the film-shaped shield 30 containing a metal film.

Each of the shielded communication cables 1 according to the respective embodiments of the disclosure contains two types of shields of the braided shield 20 and the film-shaped shield 30 as the shielding body 40 at the outer circumference of the parallel electric cable 10. The use of the two types of shields increases the volume of the conductive material surrounding the outer circumference of the parallel electric cable 10, and achieves higher noise shielding effect compared with the case where an either type of the shields is used alone. That is, it is possible to effectively block intrusion of external noise into the parallel electric cable 10, and release noise from the parallel electric cable 10 toward outside. Thus, the influence of noise on the transmission signals is lowered, whereby high-speed communication is achieved even with the parallel electric cable that is more susceptible to noise than the twisted pair wires containing paired insulated wires twisted together.

The braided shield 20 of the shielding body 40 is formed into a hollow cylindrical shape using metal elemental wires braided together. The metal elemental wire is made of a metal material such as copper, a copper alloy, aluminum, and an aluminum alloy. Alternatively, the metal elemental wire is made of a material having a plated layer such as a tin-plated layer on the surface of a thread-like base material. The braided shield 20 serves to block intrusion of external noise into the parallel cable 10 and release noise from the parallel electric cable 10 toward outside. The braided shield 20 formed by mesh-like braiding of the metal elemental wires exhibits sufficient stretchability, and serves to fasten the insulated wires 11 constituting the parallel electric cable 10 toward the center. The structure of the braided shield 20 (the number of carriers, the number of wires per carrier, pitch, etc.) may be appropriately selected in accordance with desired noise shieldability. For example, it is possible to use the braided shield 20 having a wire diameter of 0.12 mm, 12 carriers, 8 wires, and a pitch ranging from 15 to 25 mm.

The film-shaped shield 30 of the shielding body 40 is a film-like material containing a metal film. The film-shaped shield 30 serves, due to the presence of the metal film, to block intrusion of external noise into the parallel electric cable 10 and release noise from the parallel electric cable 10 toward outside. The film-shaped shield 30 is not limited specifically as long as it contains a metal film. The film-shaped shield 30 may be made of a metal film only, or made of a metal film and a material such as a base material in combination. A preferred example of the combination includes a polymer/metal combination film formed by combining a metal film with a polymer film as the base material. When a metal film and a polymer film are used in combination, the mechanical strength and handleability of the film-shaped shield 30 is increased as a whole compared with the case where a metal film is used alone.

The type of a metal contained in the film-shaped shield 30 is not limited specifically. Specific examples of a metal contained in the shield 30 include copper, a copper alloy, aluminum, and an aluminum alloy. The metal film may be made of a single type of metal, or two or more types of metal in lamination. The film-shaped shield 30 may be formed by combining materials other than the metal and the base material, such as a surface protection film and an adhesion layer as long as the noise shieldability of the shield 30 is not deteriorated.

In the case of using the polymer/metal combination film for forming the film-shaped shield 30, examples of the polymer species of the polymer film as a base material include such as polyethylene terephthalate (PET), polyolefin resin such as polypropylene (PP), and vinyl resin such as polyvinyl chloride (PVC). It is preferable to use PET as polymer species because of excellent mechanical strength and flexibility. It is especially preferable to use an Al-PET film formed by combining a PET film with an aluminum film as the film-shaped shield 30.

The following methods may be implemented for combining a polymer film with a metal film to form a polymer-metal film. In one method, a polymer film and a metal film, which have been separately prepared, are laminated and fixed using adhesive, for example. In another method, a metal film is formed on the surface of a polymer film through plating or vapor deposition. In this case, the metal film may be formed only on one surface or both surfaces of the polymer film.

The film-shaped shield 30 may be arranged at any form as long as it covers the outer circumference of the parallel electric cable 10 directly or via the braided shield 20. For example, the film-shaped shield 30 may be longitudinally arranged along the axial direction of the parallel electric cable 10, or horizontally wound around the parallel electric cable 10. In the longitudinal arrangement, the film material forming the film-shaped shield 30 is arranged along the axial direction of the parallel electric cable 10 in a way to circumferentially surround the parallel electric cable 10. The both ends of the film material surrounding the entire outer circumference of the parallel electric cable 10 are overlapped with one another and bonded in an appropriate way so that the outer circumference of the parallel electric cable 10 can be completely covered with no gaps. Meanwhile, in the horizontal winding arrangement, a tape-like film material is spirally wound around the parallel electric cable 10 with the parallel electric cable 10 being the axis to form the film-shaped shield 30. The film-shaped shield 30 is superposed at each turn of the winding and appropriately bonded so that the outer circumference of the parallel electric cable 10 can be completely covered with no gaps. The longitudinal arrangement is preferable for the film-shaped shield 30 from the viewpoint of easiness to form the film-shaped shield 30, and uniform axial covering of the parallel electric cable 10. When the longitudinal arrangement is applied for the film-shaped shield 30, the braided shield 20, the film-shaped shield 30, and the jacket 50 are formed in a continuous step with respect to the elongated parallel electric cable 10. This causes no increase in the process steps, or complication of the process, resulting in improved productivity. Further, in the longitudinal arrangement, the film-shaped shield 30 uniformly covers the parallel electric cable 10 along the axial direction of the cable 10 without substantial overlaps so that the parallel electric cable 10 can be covered uniformly. Thus, the signal attenuation caused, for instance, by resonance phenomena as a result of the periodic structure of the film-shaped shield 30 can be prevented.

(Structure of Jacket)

The jacket 50 arranged at the outer circumference of the shielding body 40 protects the film-shaped shield 30 and the braided shield 20 of the shielding body 40 as well as the parallel electric cable 10 arranged inside of the shielding body 40. Particularly, when the shielded communication cable 1 is used for an automobile, protection of the shielded communication cable 1 from the influence of water is required. The jacket 50 also plays a role of preventing the influence of water on transmission characteristic of the communication cable 1 including the characteristic impedance of the shielded communication cable 1 when water is brought into contact with the cable 1. The jacket 50 arranged at the outer circumference of the shielding body 40 stabilizes the form of the inner positioned shielding body 40, allowing the shielding body 40 to stably maintain the noise shielding effect and the effect of binding the parallel electric cable 10.

The jacket 50 is made of an insulating material. The insulating material for forming the jacket 50 contains a polymer material as a main component. The polymer material contained in the jacket 50 is not limited specifically. Specific examples of the polymer material include polyethylene, polypropylene, polyvinyl chloride, polystyrene, polytetrafluoroethylene, and polyphenylene sulfide. Further, the jacket 50 may contain additives such as a filler and a flame retardant as necessary. The insulating polymer material for forming the jacket 50 may or may not be crosslinked. When a cross-linked polymer material is used, heat resistance of the jacket 50 may be improved.

The thickness of the jacket 50 may be appropriately selected according to the required protective performance. From the viewpoint of obtaining sufficient protective performance, the thickness of the jacket 50 is preferably 0.2 mm or larger. On the other hand, from the viewpoint of avoiding excessive increase in diameter of the shielded communication cable 1 or securing sufficient flexibility of the cable 1, the thickness of the jacket is preferably 1.0 mm or smaller. From the viewpoint of simplifying the structure, the jacket 50 is preferably made of a single-layered insulating material. However, the jacket may be made of two- or more-layered insulating material.

First Embodiment

Figure 2:
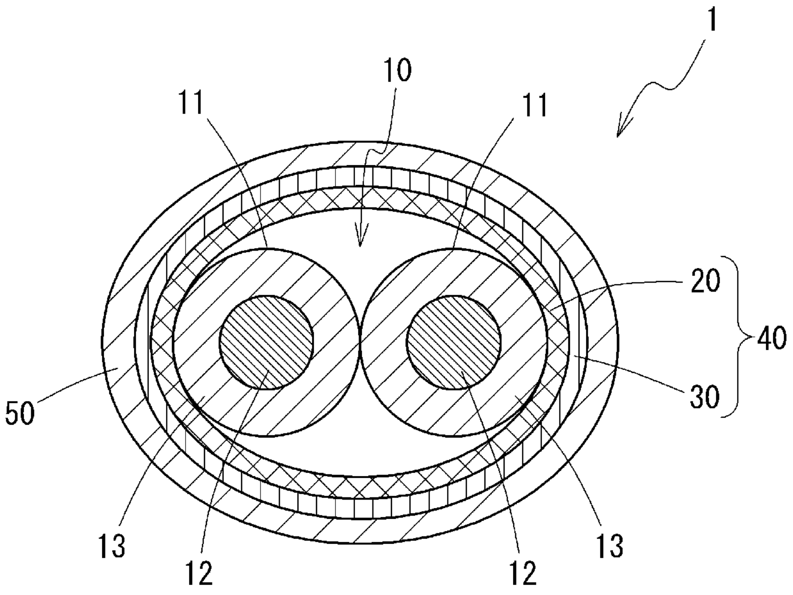
FIG. 2 is a sectional view showing the structure shown in FIG. 1 when viewed along the line A-A in FIG. 1.

A first preferred embodiment of the disclosure will be described in detail. FIG. 1 is a perspective view showing an exterior appearance of a shielded communication cable 1 according to the first embodiment. FIG. 2 is a sectional view showing the structure of the cable 1 when viewed along line A-A in FIG. 1. In the present embodiment, a braided shield 20 and a film-shaped shield 30 are sequentially arranged at the outer circumference of a parallel electric cable 10 in this order from the inner side of the cable 10. The insulated wires 11 constituting the parallel electric cable 10 are bound together due to the stretchability of the braided shield 20.

In the shielded communication cable 1 according to the present embodiment, the insulated wires 11 constituting the parallel electric cable 10 are bound together through the braided shield 20. Thus, relative movement of the insulated wires 11 may be restricted easily. Restriction of the movement suppresses relative displacement of the insulated wires 11, and enhances maintenance of the symmetry of the insulated wires 11. Thus, the propagation time difference due to a difference in length between the insulated wires 11 is suppressed, and the affection of external noise is lessened. As a result, generation of the induction noise or resonance phenomena can be effectively suppressed. The braided shield 20 having noise shieldability binds the parallel electric cable 10, whereby the shielded communication cable 1 has a small diameter and simple structure compared with the case where the parallel electric cable 10 is bound through other binding member such as an insulating tape. Thus, productivity of the shielded communication cable 1 may be improved.

The shielding body 40 contains the braided shield 20 and the film-shaped shield 30. The two kinds of shields are arranged at the outer circumference of the parallel electric cable 10 with a fastening force sufficient to restrict the relative movement of the insulated wires 11 constituting the parallel electric cable 10.

When the binding of the parallel electric cable 10 is performed through the braided shield 20, if the braided shield 20 having appropriate stretchability is used to cover the insulated wires 11 as described below for instance, the movement of the insulated wires 11 may be easily restricted. Meanwhile, when the binding of the parallel electric cable 10 is performed through the film-shaped shield 30, if the film-shaped shield 30 covers the insulated wires 11 through the longitudinal attachment or the horizontal winding of the shield 30 with the film material forming the film-shaped shield 30 having an adequate tensile strength, the movement of the insulated wires 11 may be restricted.

The order of arranging the braided shield 20 and the film-shaped shield 30 may be changed as long as the insulated wires 11 constituting the parallel electric cable 10 can be sufficiently bound together. However, if the shield arranged at the outer side has a larger force to fasten the parallel electric cable 10 than the shield arranged at the inner side, the inner side shield is likely to be loosened or wrinkled, which may lead to deterioration of the noise shieldability of the shielding body 40. Thus, it is preferable that the shield having a larger force to fasten the parallel electric cable 10 is arranged at the inner side. Since the braided shield 20 is formed into the shape of a hollow cylindrical structure and to have stretchability, the parallel electric cable 10 is strongly bound together easily when it is bound through the braided shield 20. From the above-described viewpoint, the braided shield 20 is preferably arranged at the inner side of the shielding body 40.

It is preferable that the braided shield 20 has stretchability enough to restrict the movement of the insulated wires 11 constituting the parallel electric cable 10. If the braided shield 20 has enough stretchability, the parallel electric cable 10 will be sufficiently fastened toward the center, suppressing positional displacement of the insulated wires 11 of the parallel electric cable 10, and enhancing the maintenance of symmetry of the insulated wires 11 constituting the parallel electric cable 10. As a result, even if the shielded communication cable 1 is subjected to vibration, the propagation time difference owing to a difference in length between the insulated wires may be suppressed, and the affection of external noise may be lessened. This makes it possible to stably maintain the transmission characteristic of the cable 10.

It is preferable that an outer surface of the insulated wire 11 of the shielded communication cable 1 according to the present has a large surface roughness to some extent. With this arrangement, the positional displacement hard to occur between the insulated wires 11 of the parallel electric cable 10, and the symmetry of the insulated wires 11 constituting the parallel electric cable 10 is likely to be maintained. As a result, even where the shielded communication cable 1 is subjected to vibration, the transmission characteristics of the cable 1 may be stably maintained. As the surface roughness, the dynamic friction coefficient upon mutual rubbing between the insulation coatings 13 is preferably 0.1 or larger. The surface roughness of the insulation coating 13 may be obtained by adjusting the extrusion temperature at which the insulating material is extruded for forming the insulation coating 13, or executing the surface treatment after formation of the insulation coating 13.

Second Embodiment

Figure 3:
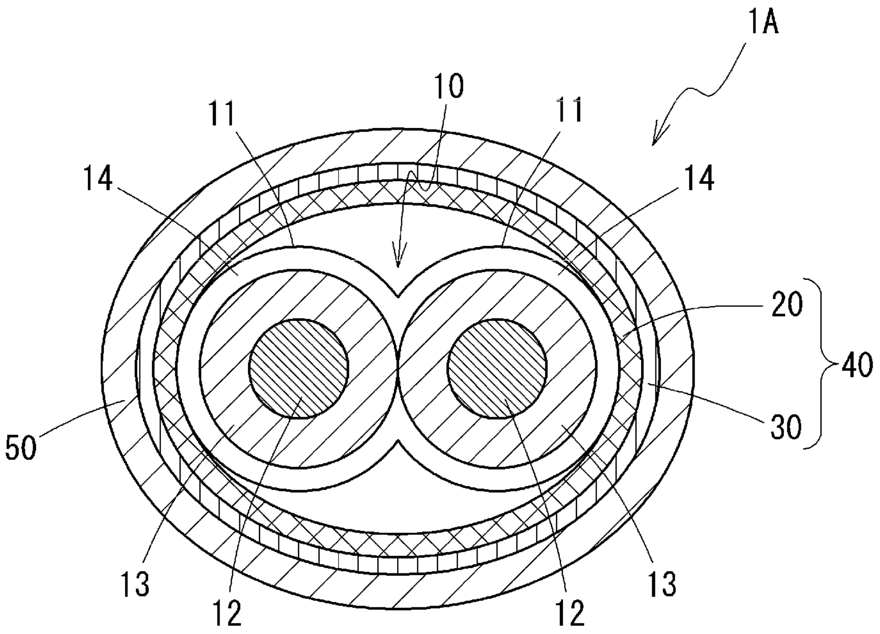
FIG. 3 is a sectional view showing a structure of a shielded communication cable according to a second embodiment of the disclosure.

A second preferred embodiment of the disclosure will be described in detail. FIG. 3 is a sectional view showing the structure of a shielded communication cable 1A according to the second embodiment. In the present embodiment, paired insulated wires 11 are integrated through fusing or bonding to constitute a parallel electric cable 10.

In the first embodiment, the paired insulated wires 11 are not fixed to each other. On the other hand, in the shielded communication cable 1A according to the second embodiment, the insulated wires 11 constituting the parallel electric cable 10 are fused or bonded together. Accordingly, in the parallel electric cable 10, no positional displacement substantially occurs between the paired insulated wires 11. This facilitates maintenance of the symmetry of the insulated wires 11 constituting the parallel electric cable 10. Accordingly, even where the shielded communication cable 1A is subjected to vibration or bending, the relative positions of the insulated wires 11 are firmly maintained, suppressing the propagation time difference owing to a difference in length between the insulated wires 11, and lessening the affection of external noise. Thus, since the insulated wires 11 are fixed to each other, generation of induction noise or resonance phenomena is suppressed, whereby transmission characteristics of the shielded communication cable 1A may be improved especially.

Examples of the method of fusing or bonding the insulated wires 11 includes: utilization of a thermoplastic resin or a material containing a thermoplastic resin as an insulating material contained in the insulation coating 13; providing of a fusion layer 14 that contains a heat-meltable material such as a thermoplastic resin onto the outer circumference of the insulation coating 13, and bonding of the insulated wires 11 arranged parallel to each other with adhesive. When a heat-meltable material such as a thermoplastic resin is contained in the insulation coating 13 or the fusion layer 14, the insulated wires 11 may be easily fused together by arranging the insulated wires 11 parallel to each other and subjecting to heating and cooling with the insulation coatings 13 or the fusion layers 14 in contact with each other. Where the fusion layer 14 is provided onto the outer circumference of the insulation coating 13, the insulated wires 11 may be fused together with suppressing deformation of the insulation coating 13 upon fusing, compared with the case where the insulation coating 13 is made of a fusible material. As a result, the spacing between the paired insulated wires 11 is likely to be kept uniform over the entire length of the parallel electric cable 10, resulting in excellent symmetry of the insulated wires 11. In this case, if the insulation coating 13 is made of a cross-linked insulating material, deformation of the insulation coating 13 upon fusing is effectively suppressed, and the symmetry of the insulated wires 11 may be especially enhanced easily.

When the parallel electric cable 10 is bonded through fusing, it is preferable that the fused parallel electric has a length in the width direction which is 1.7 to 1.9 times of a length of the cable 10 in the thickness direction. That is, each of the insulated wires 11 constituting the parallel electric cable 10 is preferably fused in the region occupying about 5 to 15% of the radius of the wire 11. If the fusing is performed within the range, the paired insulated wires 11 are fused firmly, and show excel lent bendability in the thickness direction.

In the present embodiment, the shielding body 40 is not particularly limited as long as it can sufficiently shield noise. The effect of fastening the insulated wires 11 through the braided shield 20 and the film-shaped shield 30 is not necessarily required as long as the insulated wires 11 constituting the parallel electric cable 20 are firmly fused or bonded sufficiently. However, similarly with the first embodiment as described above, the shielding body 40 is preferably configured to fasten the insulated wires 11 in case of such as separation of coupling portions of the insulated wires 11.

Third Embodiment

Figure 4:
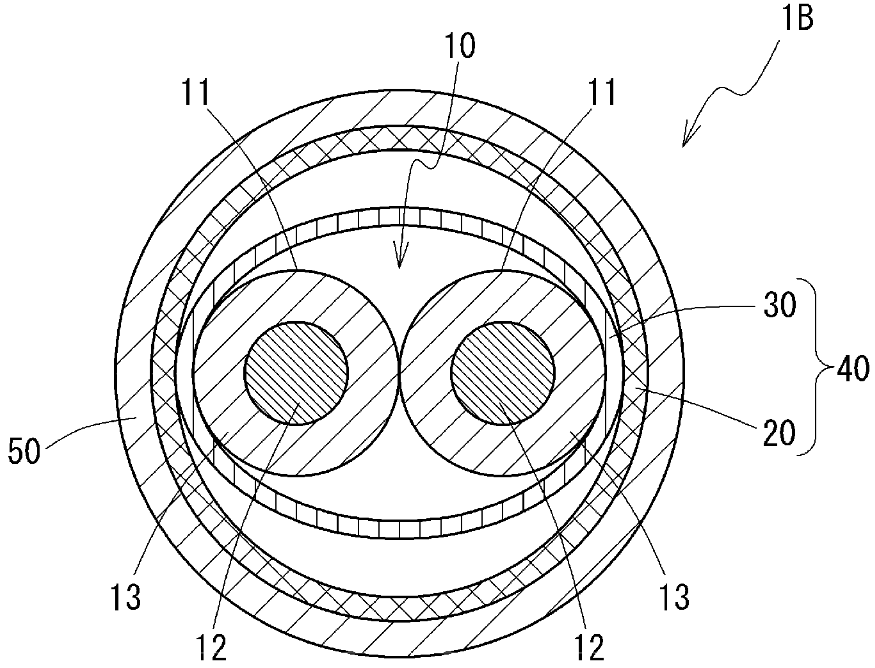
FIG. 4 is a sectional view showing a structure of a shielded communication cable according to a third embodiment of the disclosure.

A third preferred embodiment of the disclosure will be described in detail. FIG. 4 is a sectional view showing the structure of a shielded communication cable 1B according to the third embodiment. In the present embodiment, the outer circumference of the parallel electric cable 10 is covered with the film-shaped shield 30. Further, the braided shield 20 and the jacket 50 are arranged at the outer circumference of the film-shaped shield 30. The insulated wires 11 are bound together in a way not to be separated from each other with the wires 11 movable relative to each other inside the film-shaped shield 30.

In the shielded communication cable 1B according to the present embodiment, the insulated wires 11 are bound together with the wires 11 movable relative to each other inside the film-shaped shield 30. With this arrangement, when the shielded communication cable 1B is bent, the insulated wires 11 may relatively move inside the film-shaped shield 30, and rotate in the circumferential directions of the wires 11. Thus, the insulated wires 11 are displaced into appropriate positions when bended, and absorb load applied to the shielded communication cable 1B. In this case, since the outer circumferences of the parallel electric cable 10 are bound in a way not to be separated from each other with the film-shaped shield 30, the change in spacing between the insulated wires 11 hardly occurs even if the relative positions of the insulated wires 11 are changed. This makes it possible to provide the effects of exhibiting excellent symmetry of the insulated wires 11, suppressing the propagation time difference owing to a difference in length between the insulated wires 11, and lessening the affection of external noise. Thus, tolerance of the change in the relative positions of the insulated wires 11 leads to effective improvement of transmission characteristics of the shielded communication cable 1B through suppression of the generation of induction noise or resonance phenomena.

If the braided shield 20 having stretchability is used for binding the paired insulated wires 11 such that the wires 11 are not separated from each other, and movable relative to each other, it is difficult to adjust a force to fasten the parallel electric cable 10 in a low level enough to allow the insulated wires 11 to be movable relative to each other. On the other hand, the film-shaped shield 30 has no or little stretchability. Thus, it is preferable that adjustment of the force applying to the parallel electric cable 10 is performed using the film-shaped shield 30 rather than the braided shield 20. The adjustment of the force may be conducted via a tensile strength to be applied to a film material at the time when the film material constituting the film-shaped shield 30 is wound around the parallel electric cable 10.

The order of the arrangement of the braided shield 20 and the film-shaped shield 30 of the shielding body 40 is not specifically limited. However, it is preferable that the film-shaped shield 30 is arranged at the inner side. When the film-shaped shield 30 is arranged at the inner side, the adjustment of the force to fasten the parallel electric cable 10 can be performed more easily, and the surface in contact with the parallel electric cable 10 exhibits a lower frictional resistance than the case where the braided shield 20 is arranged at the inner side. Thus, the insulated wires 11 can move inside the shielding body 40 easily.

The braided shield 20 arranged at the outer side of the film-shaped shield 30 may be provided at the outer circumference of the film-shaped shield 30 either independently from or integrally with the jacket 50 to be arranged at the outer side of the braided shield 20. When the braided shield 20 is provided integrally with the jacket 50, the braided shield 20 may be arranged inside the jacket 50 using adhesive or the like, or the braided shield 20 may be buried in the jacket 50 during formation process of the jacket 50. When the braided shield 20 is integrally formed with the jacket 50, loosening or wrinkling hardly occurs in the braided shield 20 so that the noise shieldability of the shielding body 40 is stabilized. If the braided shield 20 covers an assembly of the parallel electric cable 10 and the film-shaped shield 30 covering the parallel electric cable 10 too tightly, rotational movement of the insulated wires 11 inside the film-shaped shield 30 may be prevented. Accordingly, it is preferable that the braided shield 20 loosely covers the outer circumference of the film-shaped shield 30 such that gaps are left between the braided shield 20 and the film-shaped shield 30.

In the first and the second embodiments, the movement of the paired insulated wires 11 constituting the parallel electric cable 10 is restricted so as not cause positional displacement of the insulated wires 11. This makes it possible to maintain the symmetry of the insulated wires 11, and improve the signal transmission performance. In contrast, in the present embodiment, the movement of the paired insulated wires 11 is permitted within a range in which the insulated wires 11 are not separated from each other, and a stress applied to the parallel electric cable 10 when the cable 1B is bent is absorbed, so that the symmetry of the insulated wires 11 is maintained. From the viewpoints, unlike the second embodiment, it is preferable not to fuse or bond the paired insulated wires 11 in the present embodiment.

EXAMPLES

Examples of the disclosure will be described. The present invention is not limited to these examples.

[Sample A1]

(Preparation of Insulated Wires)

A conductor to be contained in the insulated wire was prepared. Specifically, an electrolytic copper of a purity of 99.99% or higher, and master alloys containing Fe and Ti were charged in a melting pot made of a carbon, and were vacuum-melted to provide a mixed molten metal containing 1.0 mass % of Fe and 0.4 mass % of Ti. The mixed molten metal was continuously cast into a cast product of ϕ12.5 mm. The cast product was subjected to extrusion and rolling to form an elemental wire having a diameter of ϕ0.165 mm. Seven elemental wires as produced were stranded with a stranding pitch of 14 mm, and then the stranded wire was compressed. Thus, a conductor having a conductor cross section of $0.13=^2$ and an outer diameter of 0.45 mm was prepared.

Insulation coatings were prepared by formation of insulation coatings around the above-prepared copper alloy conductors by extrusion of a polypropylene resin. The insulation coating has a thickness of 0.4 mm and eccentricity ratio of 80%.

(Preparation of Shielded Communication Cable)

The two insulated wires prepared in the above-described process were arranged parallel to each other to forma parallel electric cable. A braided shield was formed to surround the outer circumference of the parallel electric cable, and a film-shaped shield was further formed to surround the outer circumference of the braided shield.

The braided shield was made of tin-plated annealed copper wires of ϕ0.12 mm (i.e., 0.12 TA) by setting the number of carriers 12, the number of wires per carrier 8, and pitch 20 mm. The film-shaped shield was prepared by forming an aluminum film on one surface of a PET film (i.e., Al-PET film) in a longitudinal arrangement.

A jacket was formed on the outer circumference of the braided shield and the film-shaped shield by extrusion of a polypropylene resin. The thickness of the jacket was 0.4 mm. The sample A1 was formed according to the first embodiment.

[Sample A2]

A fusion layer having a thickness of 50 μm was formed on the outer circumference of the insulated wire by extrusion of a polyamide resin. The two insulated wires each having the fusion layer were arranged parallel to each other, and heated at 160° C. for fusing the two insulated wires. Other than the forming process of the fusion layer, the sample A2 was prepared according to the same process for preparing the sample A1. The sample A2 was formed according to the second embodiment.

[Sample A3]

The film-shaped shield was formed to surround the outer circumference of the parallel electric cable which was similarly prepared with the sample A1, and the braided shield was further formed to surround the outer circumference of the film-shaped shield. Other than the arrangement of the film-shaped shield and the braided shield, the sample A3 was prepared according to the same process for preparing the sample A1. A gap was left between the film-shaped shield and the braided shield. The sample A3 was formed according to the third embodiment.

[Sample B1]

A twisted pair wire containing the above-described two insulated wires twisted together with a twisting pitch of 25 mm was used instead of the parallel electric cable. Other than the use of the twisted pair wire, the sample B1 was prepared according to the same process for preparing the sample A1.

[Samples B2, and B3]

Either the braided shield (sample B2) or the film-shaped shield (sample B3) as listed in Table 1 was prepared as a single-layered shielding body. Other than the formation of the single-layer shielding body, each of the samples B2 and B3 was prepared according to the same process for preparing the sample A1.

[Evaluation]

As an index that can be used to define the noise shieldability of each shielded communication cable, the induction noise level was measured, and presence or absence of resonance phenomena was confirmed. The results are shown in Table 1.

(Induction Noise Level)

Each of the shielded communication cables and a noise induction cable (thin low voltage cable for automobile, AVSS3sq) were disposed over a distance of 1 m at an interval of 7 mm. Signals having a frequency of 100 MHz was input to the noise induction cable, and a noise coupling capacitance was measured through a network analyzer. The intensity of noise generated in the shielded communication cable was defined as the induction noise level. If the induction noise level was −80 dB or lower, it was evaluated as good “A”. If the induction noise level was −90 dB or lower, it was evaluated as excellent “A+”. If the induction noise level was in excess of −80 dB, it was evaluated as failure “B”.

(Resonance Phenomena)

The signal attenuation was measured in a range from 0 to 20 GHz with respect to the shielded communication cables. If a severe signal attenuation wad observed at a certain frequency, and then improvement of the signal attenuation was not observed at a higher frequency, it was evaluated as good “A”. Meanwhile, if a severe signal attenuation was observed at a certain frequency, and then improvement of the signal attenuation was observed at a higher frequency, it was evaluated as failure “B” since resonance phenomena was occurred.

TABLE 1

| | | Shield Structure | | Induction | |
|---|---|---|---|---|---|
| | Fusing | Inner Side | Outer Side | Noise Level | Resonance Phenomena |
| Sample A1 | None | Braided | Film | A+ | A |
| Sample A2 | Done | Braided | Film | A+ | A |
| Sample A3 | None | Film | Braided | A+ | A |
| Sample B1 (twisted pair wire) | None | Braided | Film | A | B |
| Sample B2 | None | Braided | — | B | B |
| Sample B3 | None | Film | — | B | B |

The sample B1 as the twisted pair wire containing the insulated wires twisted together is hardly affected by external noise. However, due to the per iodic structure of twisting, resonance phenomena occurred at a frequency in excess of 1 GHz. The samples B2, and B3 each contain a shielding body having only one layer of either the braided shield or the film-shaped shield, and thus the samples B2 and B3 are susceptible to external noise. Further, the samples B2 and B3 are inferior in force to fasten the parallel electric cable, and are likely to cause difference in length between the paired insulated wires, leading to occurrence of resonance phenomena. On the other hand, each of the samples A1 to A3 formed according to the present disclosures exhibits excellent noise shieldability, and is unlikely to cause difference in length between the insulated wires. Accordingly, the induction noise level was suppressed, and no resonance phenomena occurred.

The embodiments of the disclosure have been described in detail. It is to be understood that the embodiments are not intended to limit the present invention but may be modified without departing from the scope of the present invention.

REFERENCE SIGNS LIST

1, 1A, 1B . . . shielded communication cable,
10 . . . parallel electric cable,
11 . . . insulated wire,
12 . . . conductor,
13 . . . insulation coating,
14 . . . fusion layer,
20 . . . braided shield,
30 . . . film-shaped shield,
40 . . . shielding body,
50 . . . jacket

The invention claimed is:

1. A shielded communication cable comprising:

a parallel electric cable comprising a pair of insulated wires arranged parallel to each other, each of the insulated wires comprising:

a conductor; and an insulation coating that covers the conductor, a braided shield comprising elemental wires braided together, and a film-shaped shield comprising a metal film, wherein the film-shaped shield and the braided shield are arranged at an outer circumference of the parallel electric cable in this order from an inner side of the cable, the film-shaped shield is wound around the parallel electric cable with a tensile strength adjusted to a low level which allows the film-shaped shield to fasten the parallel electric cable loosely enough such that the insulated wires are movable relative to each other, the braided shield loosely covers the outer circumference of the film-shaped shield so as not to prevent rotational movement of the insulated wires arranged inside the film-shaped shield with gaps left between the braided shield and the film-shaped shield, and by the configurations of the film-shaped shield and the braided shield, the insulated wires arranged inside the film-shaped shield are movable relative to each other, and rotatable in circumferential directions.

2. The shielded communication cable according to claim 1, wherein the shielded communication cable comprises a jacket that is made of an insulating material, and covers the braided shield, wherein the braided shield is buried in the jacket.

* * * * *